United States Patent [19]

Rowley

[11] Patent Number: 5,527,503
[45] Date of Patent: Jun. 18, 1996

[54] METHOD FOR BELLING TUBING ENDS WITHOUT WALL THINNING

[76] Inventor: William R. Rowley, 15760 Madison Rd., Middlefield, Ohio 44062

[21] Appl. No.: 327,028

[22] Filed: Oct. 21, 1994

Related U.S. Application Data

[63] Continuation-in-part of Ser. No. 62,848, May 14, 1993, abandoned.

[51] Int. Cl.⁶ .................................................. B29C 57/04
[52] U.S. Cl. .......................................... 264/296; 264/322
[58] Field of Search .................................. 264/296, 322

[56] References Cited

U.S. PATENT DOCUMENTS

| | | | |
|---|---|---|---|
| 3,470,900 | 10/1969 | Rothauser | 137/247.51 |
| 3,719,209 | 3/1973 | Rush et al. | 138/177 |
| 3,723,946 | 3/1973 | Weatherup et al. | 439/320 |
| 3,843,300 | 10/1974 | McFarlane | 425/384 |
| 3,917,497 | 11/1975 | Stickler | 156/73.5 |
| 3,929,958 | 12/1975 | Parmann | 264/249 |
| 4,005,879 | 2/1977 | Berger et al. | 285/31 |
| 4,009,982 | 3/1977 | Maier | 425/389 |
| 4,059,379 | 11/1977 | Korff et al. | 264/322 X |
| 4,081,190 | 3/1978 | Itzler | 285/226 |
| 4,113,813 | 9/1978 | Wilson | 264/25 |
| 4,135,961 | 1/1979 | Yoshizawa et al. | 156/242 |
| 4,140,739 | 2/1979 | Cotten | 264/138 |
| 4,152,817 | 5/1979 | Cotten | 29/890.14 |
| 4,175,917 | 11/1979 | Cotten | 425/142 |
| 4,177,237 | 12/1979 | Ueno et al. | 264/296 |
| 4,264,661 | 4/1981 | Brandolf | 264/22 |
| 4,266,815 | 5/1981 | Cross | 285/330 |
| 4,316,870 | 2/1982 | Rowley | 264/296 |
| 4,446,084 | 5/1984 | Rowley | 264/40.6 |
| 4,525,136 | 6/1985 | Rowley | 425/384 |
| 4,575,044 | 3/1986 | Gentry | 251/145 |
| 4,664,423 | 5/1987 | Rowley | 285/256 |
| 4,803,033 | 2/1989 | Rowley | 264/339 |
| 4,887,852 | 12/1989 | Hancock | 285/175 |

FOREIGN PATENT DOCUMENTS

| | | | |
|---|---|---|---|
| 938952 | 12/1973 | Canada. | |
| 2838731 | 3/1980 | Germany. | |
| 1172566 | 12/1969 | United Kingdom | 285/354 |
| 1421530 | 1/1976 | United Kingdom | 285/423 |

*Primary Examiner*—Leo B. Tentoni
*Attorney, Agent, or Firm*—Oldham & Oldham Co.

[57] ABSTRACT

A unitary molded tubular connector and method for forming the connector is described. The connector has an end cap of first internal diameter, a tubular segment of diameter equal to that of the end cap, a threaded fastening means, and a belled tubular end having a larger internal diameter and outer diameter, but of the same thickness as the tubular segment. The connector is prepared by the steps which include (1) placing an end of the tubular connector partially on a projecting mandril emanating from a male die, the male die including a cup-shaped recess from which the mandril projects axially and concentrically; (2) heating some of the tubular connector projecting from a female die sufficiently to make such projecting portion pliable enough to form; (3) forming the heated portion of the tubular connector into the end cap by the cooperating recesses of the male and female dies; (4) inserting the internally-threaded nut onto the tubular connector; and (5) repeating the initial processing steps with a second male die which includes an annulus-shaped recess which increases from a first internal diameter to a second internal diameter and correspondingly increases from a first outer diameter to a second outer diameter so as to maintain the connector wall thickness constant.

11 Claims, 5 Drawing Sheets

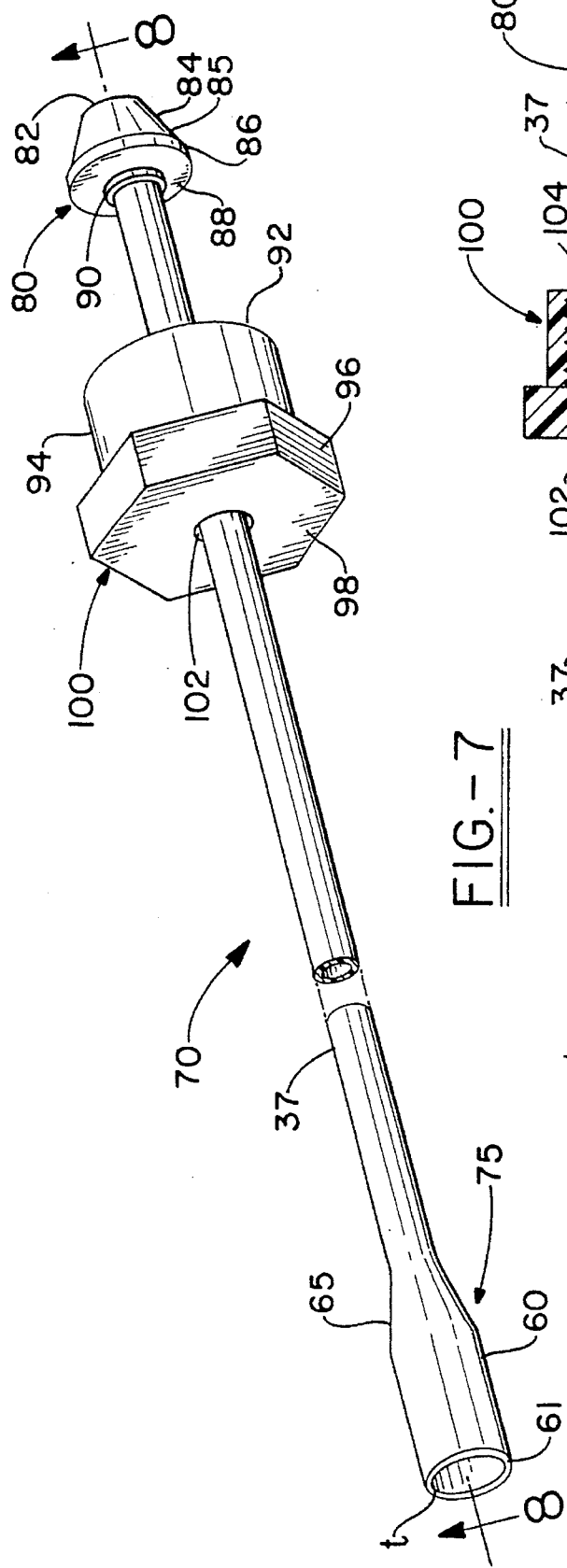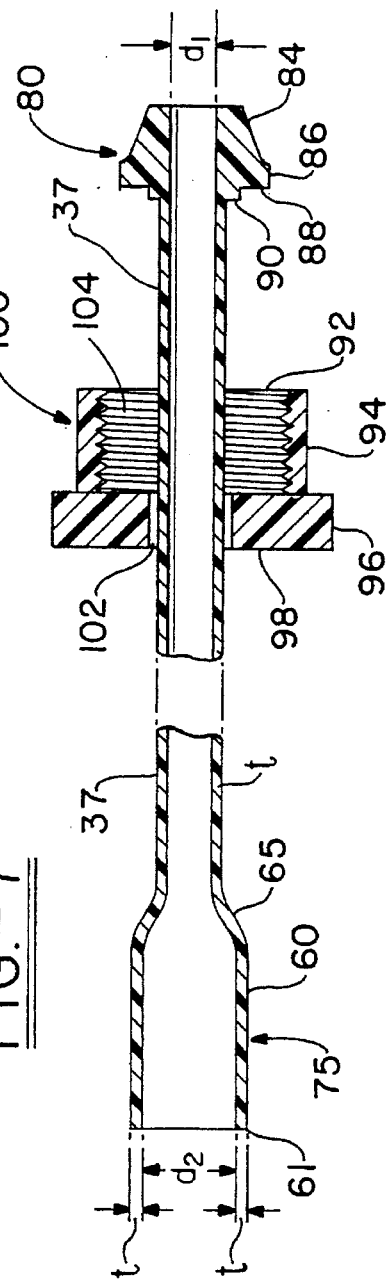
FIG.-7
FIG.-8

5,527,503

1

METHOD FOR BELLING TUBING ENDS WITHOUT WALL THINNING

This is a continuation-in-part of application Ser. No. 08/062,848 filed on May 14, 1993, now abandoned.

TECHNICAL FIELD

The invention described herein pertains generally to a method for belling a polymer tubing end without compromising wall thickness, thereby enabling the workpiece to be suitable for plumbing applications.

BACKGROUND OF THE INVENTION

In plumbing installations, copper tubing is widely employed. In risers, used for connecting tubing to fixtures or tanks, the end of the copper tubing is shaped to form a bulb sealing surface and such bulb includes a shoulder permitting the tubing and thus the bulb sealing surface to be drawn into biting or sealing engagement with the fixture. The cost of such copper tubing and the cost of forming the same to permit the connection to such fixtures or tanks is substantial.

More recently, polybutylene has been approved for use in plumbing. Polybutylene is a relatively new polyolefin. Tubing or pipe made of polybutylene is normally joined by heat-fusion techniques, by mechanical compression, and by cold flaring. In order to provide such polybutylene tubing with a bulb sealing surface or an end cap for such purposes, a variety of techniques have been employed. Two commonly employed techniques are: (1) spin-welding a separately molded bulb onto the outer diameter (O.D.) of the end of a tube; or (2) insert molding a bulb onto the O.D. of the end of a tube. Another technique is to form a flange on the O.D. of the tube and again to insert a separately molded neoprene or like concave washer on the flange for sealing purposes. All such processes have cost and performance drawbacks. Most require separately molded parts which must be joined to the tubing in assembly operations. Moreover, a two-part tubing end cap or bulb sealing construction does not have the performance integrity or the expected useful life of the tubing itself. In the spin welding technique, excessive clamping pressures may cause the loaded part to become dislodged or separated from the O.D. of the tubing and the interface of the parts provides a possibility of leakage. In the case of a neoprene or like washer employed on the O.D. of the tubing, the same interface leakage susceptibility is present. Moreover, a flange formed to receive the washer may itself create a point of weakness if excessive clamping pressures are employed. Further neoprene washers are known to deteriorate with age and temperature exposure. Lastly, insert molding forces hot material over a cold tube surface, which can separate from the tube.

The solution to this problem of providing polybutylene tubing with an attached bulb sealing surface of unitary construction is detailed in U.S. Pat. Nos. 4,316,870, 4,446,084 and 4,525,136, which are hereinby incorporated fully by reference. The thrust of these references however, is to teach the ability to maintain a constant diameter opening within the tubing, while the wall thickness is variable. This is of necessity, due to the configuration of the mold cavity, and insertion of the mandril inside the tubing during the processing steps.

A corresponding associated problem with the formation of the above-described male end of the polybutylene tubing, is the ability to bell an opposed end of the tubing, without any accompanying wall thickness compromise, which would make the product unsuitable for all plumbing applications, for which polybutylene has been approved, provided that a wall thickness can be maintained at 0.062"+0.010", as defined by ASTM 3309.

In particular, it is desirable to use ⅜" O.D. polybutylene tubing with wall thickness of 1/16" (0.062") and subsequently insert a ½" CTS (copper tube size) fitting of nominal 0.501" O.D. The only way this can be achieved is through belling one end of the tubing from ⅜" O.D. (¼" I.D.) to ⅝" O.D. (½" I.D.). While it is possible to use ⅝" O.D. tubing to start, this uses more raw materials than necessary.

Additional prior art solutions to the formation of a bell on one end of polybutylene tubing is by heating a portion of the end of the tubing, followed by insertion of a mandril into the heated open end, the O.D. of the mandril being matched to the targeted inner diameter (I.D.) of the tubing. While this approach will bell the tubing, it is incapable of reproducibly making tubing product with a constant wall thickness of 0.062"+0.010" throughout the belled end, particularly in the neck region of the bell. This is due to the fact that the bell is made by expanding the I.D. and thusly thinning the walls.

To date, there has been no effective way to bell an end of tubing from a smaller diameter to a larger diameter opening, which is of code (ASTM 3309) specified thickness initially, without thinning out a portion of the wall of the tubing, particularly in the neck region.

SUMMARY OF THE INVENTION

In accordance with the present invention, there is provided a method for belling a tube of initial internal diameter to a larger internal diameter while maintaining at least a constant wall thickness throughout the tubing.

It is an object of this invention to provide a plastic tube for plumbing which uses ⅜" O.D. tubing (¼" I.D.), of thickness 1/16", upon which a unitary bulb and sealing surface is on one end thereof and upon the opposed end is a belled end of ⅝" O.D. (½" I.D.), of thickness 1/16", which can accept a ½" CTS fitting.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 7 is a perspective view showing the male and female segment of a section of tubing made in accordance with the teachings of this invention, wherein the male segment is an integrally molded bulb and sealing surface and the female segment is shown belled to a larger diameter, the thickness of the tubing being constant throughout, with internally threaded nut shown slightly below the male segment;

FIG. 8 is an enlarged cross-sectional view taken along line 8—8 of FIG. 7;

DETAILED DESCRIPTION OF THE INVENTION

Figures 1, 2, 3:
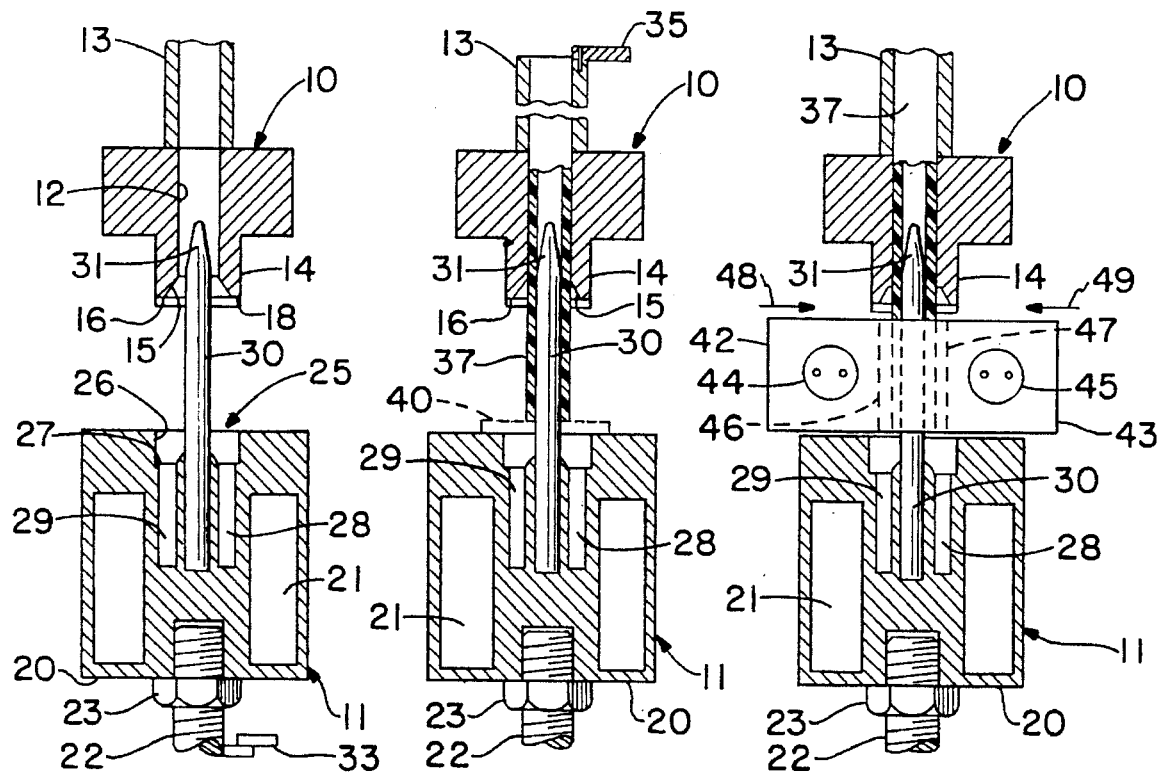
FIG. 1 is a fragmentary vertical section of the dies employed to form the tubing in accordance with the present invention, such dies being shown separated from each other.
FIG. 2 is a view similar to FIG. 1 showing the tubing inserted through the female die, partially inserted on the male die and projection a predetermined distance from the former.
FIG. 3 is a view similar to FIGS. 1 and 2 showing the tube projection portion being heated.

Referring now to the drawings wherein the showings are for purposes of illustrating the preferred embodiment of the invention only and not for purposes of limiting the same, the Figures show cut lengths of plastic tubing upon which a belled end is formed thereon.

As seen in the figures, the tubing comprises a top vertically fixed mold 10 and a vertically movable bottom mold 11. The top mold or die 10 includes a central bore 12 and a riser tube 13 secured to the top thereof having an I.D. the same as the I.D. of the bore 12. The lower surface of the top mold is provided with a cylindrical projection 14 projecting centrally therefrom. The lower end of the bore is provided with a conical flaring portion 15, the lower end of which is provided with a small radius seen at 16. Radially beyond such radius, the bore is terminated in an axially extending edge 18.

The bottom mold 11 includes a body 20 which may include an annular passage 21 for the circulation of cooling medium therethrough. The body 20 is threadedly connected to rod 22 of a piston-cylinder assembly and adjustably locked thereto by the nut 23. The top of the mold or die 11 is provided with a central recess shown generally at 25 which includes an upper cylindrical portion 26 into which the axial projection 14 of the top mold is designed closely to telescope. The lower end of the cylindrical portion is provided with a shoulder 27 separating the cylindrical portion of the recess from circular bulb forming cavity 28. The lower circular bulb forming cavity is provided with a horizontal circular axially facing end face 29 which is selectively larger in diameter than the diameter of the bore 12. Projecting axially from the bottom of the recess 25 is a guide rod 30, the top of which is provided with a pilot nose or pointed portion 31.

In FIG. 1, the top and bottom molds or dies have been brought to an intermediate position relative to each other in that the bottom mold 11 has been brought to an intermediate elevated position and the position may be determined by a retractable adjustable stop as seen at 33 in FIG. 1. In such position, the pilot nose of the guide rod 30 projects into the bore 12 as shown.

Referring to FIG. 2, it will be seen that the top of the guide tube 13 is provided with a back stop seen at 35 which may be pivoted to the top of the guide tube 13 for swinging movement to and from a position clear of the I.D. of such tube or over the I.D. of such tube.

An extruded plastic, preferably polyolefin, and more preferably, polybutylene, tube section, cut to a predetermined length, is now inserted downwardly through the guide tube as seen at 37 to project from the lower end of the top mold 10. The dimensions of the tube O.D. and I.D. are such that the tube will fit snugly in the I.D. of the bore 12 with the I.D. of the tube fitting snugly over the O.D. of the rod 30. It is important that the tube 37 project a predetermined distance below the top mold 10. This predetermined distance can be obtained in several ways. When the operator inserts the tube, the operator can insure that the top of the tube is flush with the top of the guide tube 13 and pivoting the back stop 35 over the top of the tube gages the tube against such back stop. In this manner, the tube length may be gaged from the top end to project the predetermined distance noted. Alternatively, a gage bar, shown at 40 may be employed to contact the lower end of the tube to obtain the desired projection.

With the molds still in their intermediate position and the tube properly positioned and projecting from the top mold, the projecting end of the tube is now heated as seen in FIG. 3. The heating of the tube may be accomplished in a variety of ways. In FIG. 3, two heating blocks 42 and 43 are employed, each provided with electrical heating elements seen at 44 and 45, respectively, to confine the projecting end of the tube 37 therebetween. It will of course be appreciated that other forms of application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold when the dies are brought together. While those skilled in the art are familiar with the temperatures described in this operation, for illustrative purposes only, this temperature would be approximately 700° F.±16° F. for a time of between 20–30 seconds in the case of polybutylene, and approximately 700° F.±16° F. for a time between 30–40 seconds for polypropylene. It is well within the skill of those in the art to vary the time and/or temperatures noted to achieve the desired degree of "softness" necessary for further processing.

Figures 4, 5, 6:
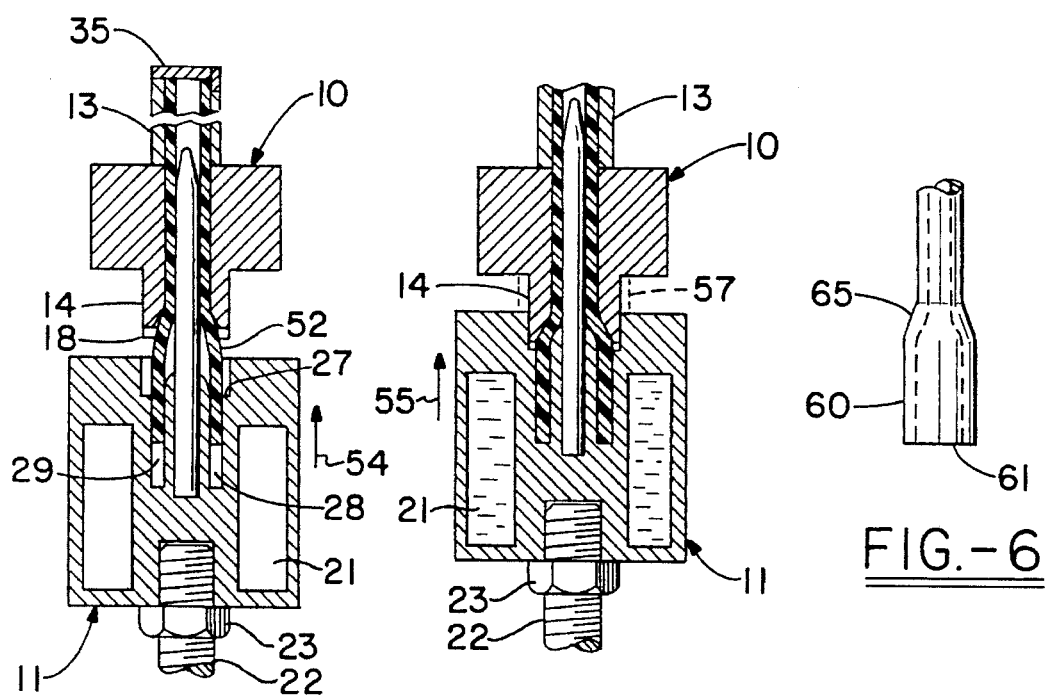
FIG. 4 is a view similar to FIGS. 1–3 showing the dies being brought together.
FIG. 5 is a view similar to FIG. 4 showing the dies closed.
FIG. 6 is a fragmentary elevation of the end of the tube as formed by the process depicted in FIGS. 1–5.

After the desired amount of heat is applied, the heating blocks are removed. Depending upon the polymer and/or time and/or temperatures used, a cooling cycle may be employed before the initiation of the next step. If a bottom gage is employed, the gage 40 is also removed and the retractable step 33 is withdrawn. With the back stop 35 in place, the piston-cylinder assembly of the rod 22 is now further extended as seen in FIG. 4 and the projecting end of the tube seats in the bottom face 29 of the bulb forming cavity 28 and begins to form as seen at 52. As the bottom mold 11 moves upwardly as indicated by the arrows 54 and 55 in FIGS. 4 and 5, respectively, the axial projection 14 of the top mold telescopes within the cylindrical recess 26 of the bottom mold. The bottom mold continues upwardly to the position shown in FIG. 5 forming the tube end as indicated. During such movement, the back stop 35 keeps the tube from moving upwardly with respect to the top mold. The piston-cylinder assembly is fully extended until the edge 18 of the top mold engages the shoulder 27. Such edge will tend to bite off or render easily removable any flash formed between the telescoping surfaces of the molds. Alternatively, a stop or gage ring can be provided as seen at 57 to limit the relative movement of the molds to avoid wear on the edge 18. When the molds are fully together as seen in FIG. 5, a cooling medium may be circulated through the passage 21 as seen at 58. While water is preferred, it will be appreciated that the cooling medium could be many other fluids such as oil or a gas.

After the mold has been cooled for a predetermined time, the piston-cylinder assembly of the rod 22 is fully retracted and the top mold may be indexed horizontally so that the now formed tube may be removed. If any flash appears, it can readily be removed from the tube. While the discussion has focused on the top mold being of unitary construction, it is equally envisioned that a split mold could be employed. In this embodiment, and the piston-cylinder assembly is fully retracted, the split halves of top mold 10 would be opened and the part removed from the top mold in a vertical direction.

After the tube is removed, the top mold remains in alignment with the bottom mold and the stop 33 is returned to its position and the piston-cylinder assembly is extended to bring the molds back to the original FIG. 1 position so that the process may be repeated.

It will be appreciated that the tooling illustrated may be either horizontally or vertically oriented and that the recess configurations may be readily altered to form a belled end of varying configurations. Also, the tube holder 13 can be readily changed to accommodate tubes precut to different lengths. In practicing the process, it is important however, that the projecting heated end of the tube substantially conform to the volume of the mating recesses in the two dies or molds. Whether employed horizontally or vertically, the relatively fixed mold 10 may be termed the female mold while the moving mold 11 with the guide rod projecting therefrom and holding the I.D. of the tube may be termed the male mold or die.

The resultant product is seen in FIG. 6. The plastic tube thus formed includes an integrally formed belled end into which a suitably dimensioned copper fitting for example, could be inserted. The plastic tube thus formed, includes an integrally formed belled surface 60 extending from the end face 61 of the tube to conical neck 65. The end face 61 of the tube has both a larger I.D. and O.D. than the remainder of the tube, but the thickness of all portions of the tube are the same.

Figure 11:
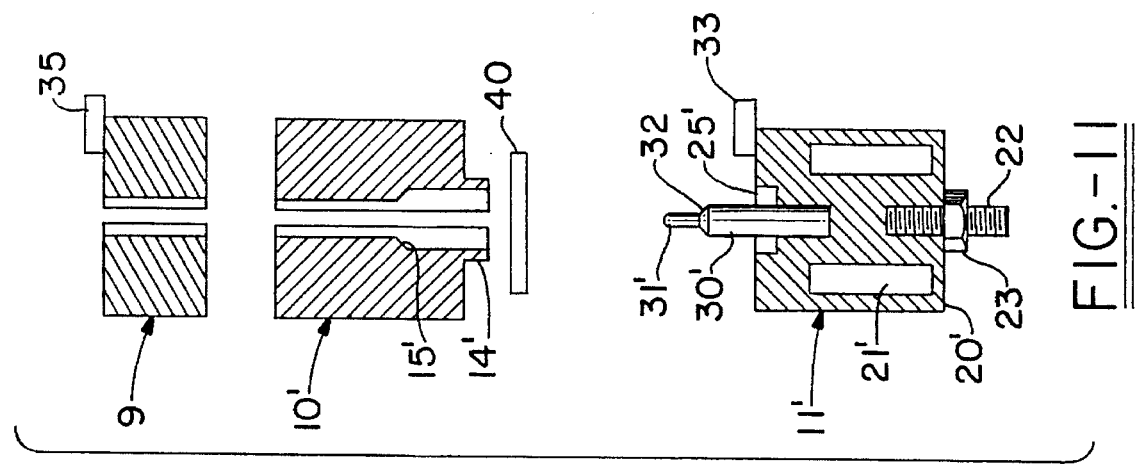
FIG. 11 is a fragmentary vertical section of the dies employed to form the tubing in accordance with the present invention, the dies being shown separated from each other.

As shown in FIG. 11, alternative mold designs are envisioned equally applicable to the process described previously. In discussing this alternative embodiment, like part numbers are referred to using the same reference numerals described previously. Similar, but modified parts are designated by the inclusion of a prime (') after the reference numeral. The device includes a top vertically moveable two-piece horizontally operating clamping die 9, a center vertically-fixed two-piece horizontally operating mold 10' and a vertically moveable bottom mold 11". The clamping die 9 includes a central bore, the diameter of which is equal to a diameter sufficiently smaller than the diameter of the tube to be belled so as to cause a clamping effect on the tube when the clamp die 9 is closed.

The center vertically-fixed two-piece horizontally operating mold 10' includes a central bore, of the same diameter as the tube to be belled. The lower end of the bore is provided with a conical flaring portion 15, the lower end of which is of a diameter and length equal to the outside diameter and length of the belled end of the tube.

The bottom mold 11' includes a body 20 which may include an annular passage 21 for the circulation of a cooling medium therethrough. The body is threadedly connected to rod 22 of a piston-cylinder assembly and adjustably locked thereto by nut 23. The bottom mold or die 11' is provided with a central recess shown generally at 25 into which the axial projection 14' of the top mold 10' is designed closely to telescope. Projecting from the bottom of the recess 25' is rod 30', the diameter of the rod at the bottom of the recess of equal diameter to the I.D. of the belled end of the tube and maintained for a distance equal to the depth of the tube bell. Rod 30' terminates at top 31' and is radiused to corresponding conical flaring portion 15 at conical segment 32.

Figure 12:
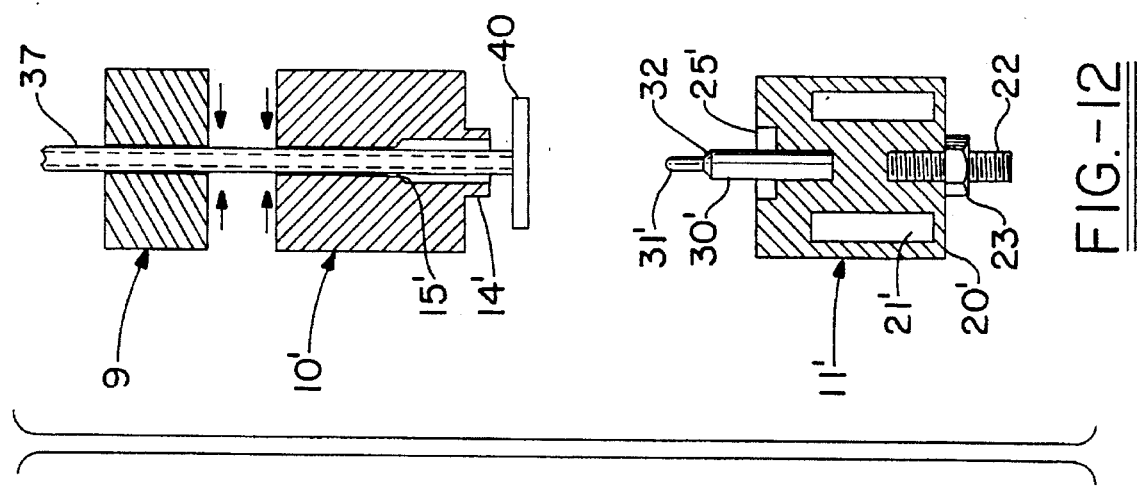
FIG. 12 is a view similar to FIG. 11 showing the tubing inserted through the female die, and projecting a predetermined length therefrom.

In sequenced operation and shown in successive figures, this modified mold and die design is identical in concept, and implementation to that previously detailed and all related discussion is equally applicable to either embodiment. As shown in FIG. 12, extruded plastic 37 is inserted through clamping mold 9 and top mold 10', resting on tube position stop 40. The two halves of the clamping mold 9 are closed thereby holding extruded plastic 37 firm.

Figure 13:
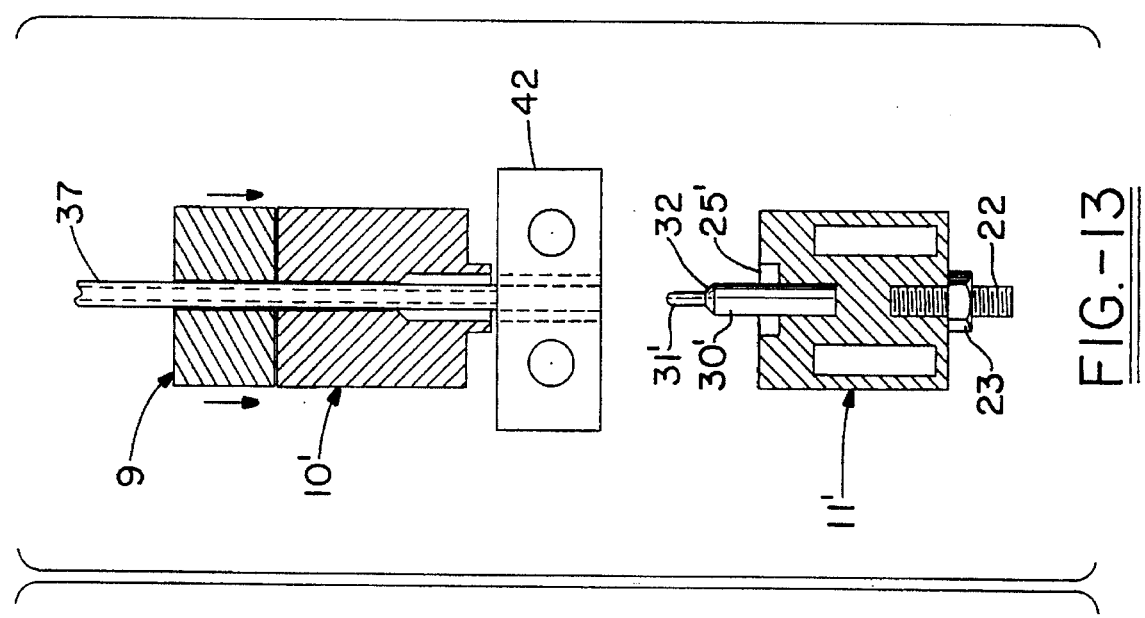
FIG. 13 is a view similar to FIGS. 11 and 12 showing the tube projection portion being heated.

In FIG. 13, clamping mold 9 is moved to a position extending the lower end of the extruded plastic 37 into a cavity in heating blocks 40. The split halves of center mold 10' are closed about the circumference of extruded plastic body 37 during the heating cycle to provide stability to the tube during the heating cycle.

Figure 15:
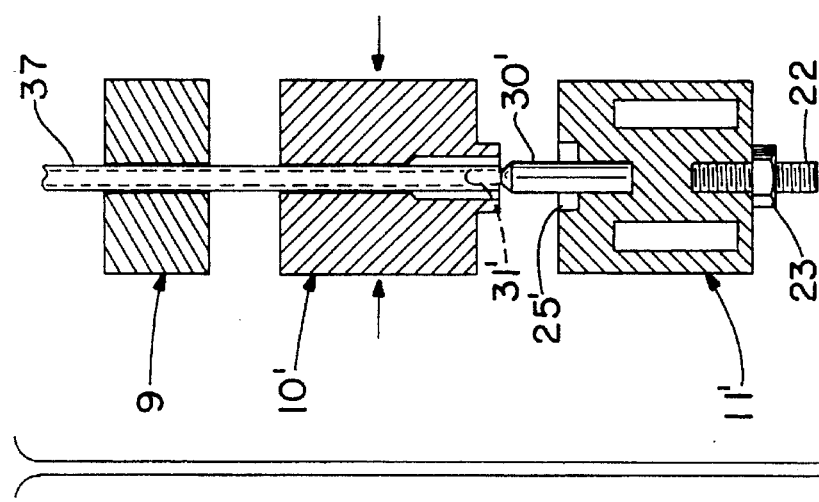
FIG. 15 is a view similar to FIGS. 11–14 showing the dies being brought together.
Figure 14:
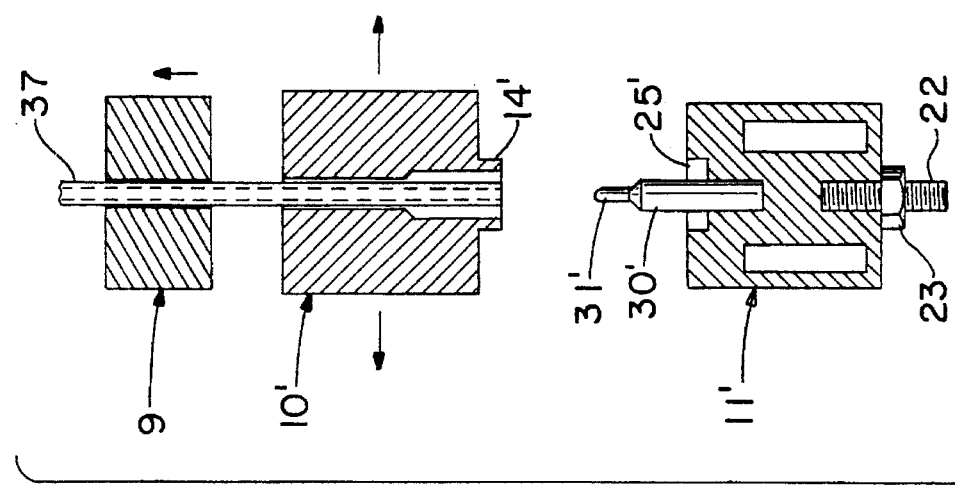
FIG. 14 is a view similar to FIGS. 11–13 showing the clamping die retracting the projecting tubing portion back into the middle die for subsequent belling.

With the heating cycle completed, center mold 10' is opened and clamping mold 9 returned to its original disengaged position. The heated end of extruded plastic 37 is now positioned in the belled cavity of center mold 10' as shown in FIG. 14. In FIG. 15, the center mold 10' has been closed about extruded plastic 37 and bottom mold 11' moved upward with the pilot nose 31' of guide rod 30' penetrating the heated end of the tube.

Figure 16:
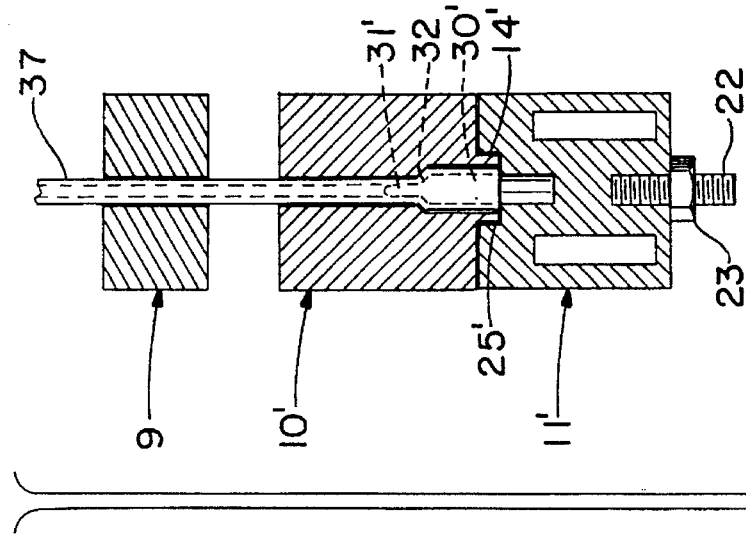
FIG. 16 is a view similar to FIGS. 11–15 showing the dies closed.

In FIG. 16, bottom mold 11' is completed extended, forcing the heated plastic into the cavity created at the connection center mold 10' and bottom mold 11'. After a sufficient period of cooling, all molds are returned to their original positions and the belled tube is then removed from the molds.

FIG. 7 illustrates the completed plumbing connector 70 comprising a unitary molded end cap 80, nut 100, and belled end 75. The length of connector 70 is of any length, and configuration. It may be straight or contain a myriad of bends and twists. What is critical however, is that subsequent to the formation of the end cap 80, the nut 100 is positioned onto the connector with the open face 92 of nut 100 facing toward end cap 80. It is not possible to insert nut 100 subsequent to the belling step described previously.

Unitary molded end cap 80 comprises a belled sealing surface 84 extending from the end face 82 of the tube to radially extending flange 86. The sealing surface 84 may be radiused as indicated or it may be conical. The end face 82 of the tube has a slightly larger O.D. than the remainder of the tube so that the wall of the tube at the sealing surface is substantially enlarged throughout its length. The sealing surface terminates in the flange 86 which includes a stop face 85 adjacent the sealing surface and a shoulder 88 on the opposite side. From the shoulder to the O.D. of the tube, there is provided a fillet 90 which joins the flange spaced from the peripheral edge thereof with either a slight radius 65 as shown in FIG. 6 or a collar 90 as shown in FIG. 7.

Nut 100, which is inserted prior to the belling step, and after the formation of unitary molded end cap 80, is positioned onto connector 70 of diameter $d_1$ through nut opening 102 which is of larger diameter than $d_1$, but of smaller diameter than shoulder 86, with open face 92 positioned toward end cap 80. Nut 100 contains a threaded circular bore 104 of predetermined height 94 which is used to sealingly engage a mating threaded receiver (not shown). As nut 100 is tightened by a plurality of parallel-spaced ridges 96, end cap 80 is brought into leak-proof engagement with the threaded receiver by the top surface 98 of nut 100, through its engagement onto shoulder 88 of end cap 80 as best shown in FIG. 8.

Connector 70 is thus, of unitary construction, of original diameter $d_1$ and thickness t, which through the process of heating and molding into an appropriately configured die, is shaped into end cap 80, still of diameter $d_1$. After insertion of nut 100, and subsequent heating of an opposed end to end cap 80 of connector 70, followed by molding into a second appropriately configured die, belled end 75 is fabricated of larger diameter $d_2$, but still of thickness t.

Figure 9:
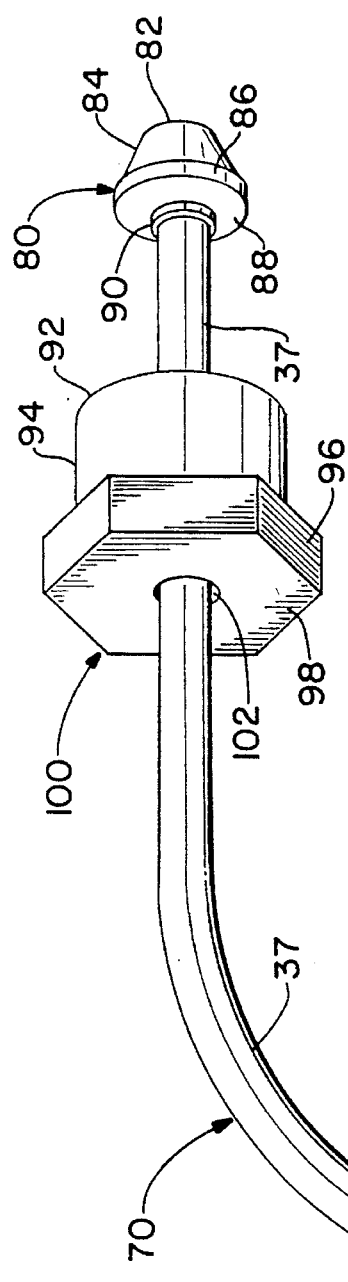
FIG. 9 is a perspective view showing the tubing of FIG. 7 illustrating a non-linear configuration of the tubing.

As shown in FIG. 9, the plumbing connector 70 need not be in a linear configuration along a longitudinal axis of the connector. In fact, non-linear configurations are well-within the scope of the invention. Such bends within the connector can be: (1) permanent, the result of post fabrication techniques, such as mild, fairly localized heating to a softening point of the material, followed by bending and molding within a fixture that will hold the desired angle and radius, followed by cooling, and other processes which are known-in-the-art; or (2) non-permanent.

Figure 10:
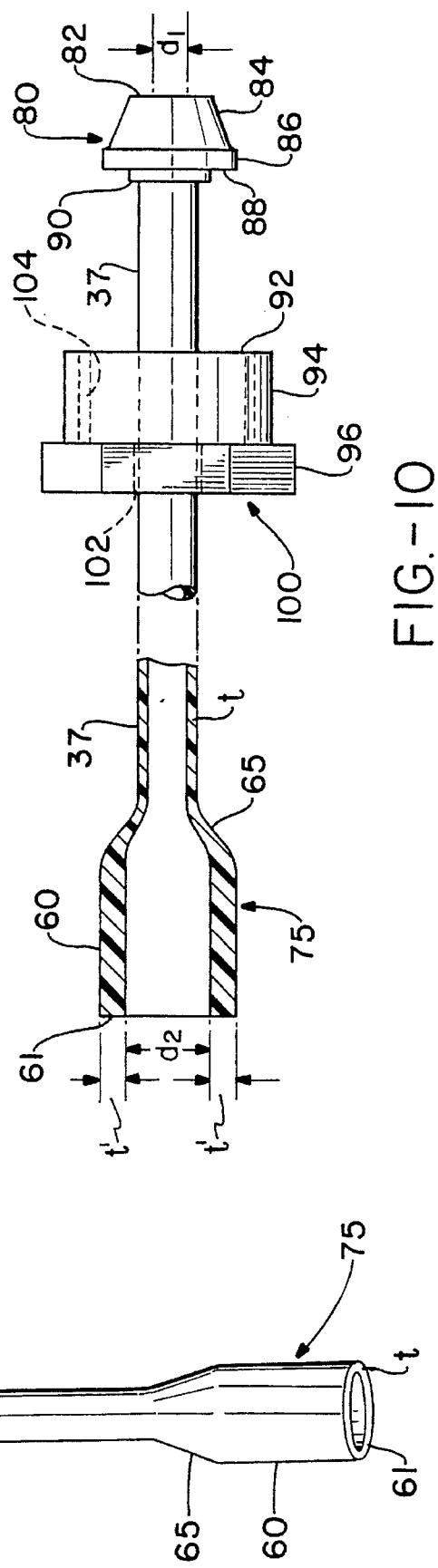
FIG. 10 is an enlarged cross-sectional view similar to FIG. 8 illustrating an increased thickness of the tubing in the belled region.

While the plumbing connector wall thickness t, has been shown to be the same throughout, the application is not necessarily limited to such. As shown in FIG. 10, it is possible to fabricate plumbing connector 70 wherein the wall thickness t', is greater than that of the mid-portion of tube 37. In other words, t'>t. Such a configuration is made by increasing the thickness of the die cavity containing circular bulb forming cavity 28. As discussed previously in relation to a constant wall thickness t, thickness t' will require that tube 37 project an even longer distance below top mold 10 than used when thickness t is desired. This is necessary such that subsequent to the softening of the projecting end of tube 37 via the action of heating blocks 42 and 43, or other heating means, and the dies have been brought together, the larger die void, i.e., bulb forming cavity 28 will be filled with polyolefin.

As previously indicated, polybutylene is the preferred material, although other polyolefin resins may be formed in the same manner. Polybutylene is preferred because of its approval for plumbing installations.

The best mode for carrying out the invention will now be described for the purposes of illustrating the best mode known to the applicant at the time. The examples are illustrative only and not meant to limit the invention, as measured by the scope and spirit of the claims.

EXAMPLE #1

Preparation of a Belled End of a Connector from a Cylindrical Rod of Uniform Thickness During the process for forming a belled tubular end of a connector, the belled end of the connector having at least the same wall thickness as the main body of the hollow cylindrical tube from which it was prepared, the following steps were employed. One end of a hollow cylindrical tube of constant thickness and constant internal and external diameter, was was partially placed on an elongated male die projection of a male die, the projection of the male die closely conforming to the first internal diameter of the tubular connector. The configuration of the male die included an annulus-shaped recess which increased from the first internal diameter of the hollow cylindrical tube to the second internal diameter of the belled end and correspondingly increased from the first outer diameter to the second outer diameter so as to maintain the thickness constant. The male die projection projected axially and concentrically. Surrounding the first outer diameter of the tubular connector was a female die, which included a recess adapted to cooperate with the recess of the male die.

The dies where the belled end was to be formed were held apart, while the portion which would form the belled end which projected from the female die, was placed at least partially on the male die projection. A portion of the tubular connector which was projecting from the female die was heated sufficiently to make such projecting portion pliable enough to form and flow under melt flow conditions. When the connector is made of polybutylene, the temperature of this step is about 700° F. for about 20–30 seconds. The heated portion of the tubular connector was physically pushed into the belled end of the cooperating recesses under the melt flow conditions so as to produce a uniform thickness belled end. Typically, the additional step of cooling the tubular connector occurs at this point in the process, typically by cooling at least one of the dies after they are brought together.

EXAMPLE #2

Preparation of a Connector From a Cylindrical Rod of Uniform Thickness wherein the Connector has an End Cap with a First Internal Diameter, a Main Body of the Same Internal Diameter as that of the End Cap and a Belled End with an Interposed Nut Between the End Cap and Belled End In the process of forming the connector, the cylindrical rod of uniform thickness is partially positioned on a first elongated male die projection of a first male die with the projection closely conforming to the first internal diameter of the tubular connector. The first male die includes a cup-shaped recess from which the first male die projection projects axially and concentrically. The tubular connector is surrounded with a first female die, which also includes a recess adapted to cooperate with the recess of the first male die. The dies which will form the end cap are positioned apart with the cylindrical rod which projects from the first female die is at least partially placed on the first male die projection. The portion of the cylindrical rod which will form the end cap is heated, making it pliable enough to form. The heated portion of the tubular connector is thrust into the shape of an end cap by the cooperating recesses, the end cap having an end face, a sealing surface originating from the end face and terminating in a flange having a circular shoulder and further having a centrally disposed aperture therethrough. Due to the heating which for polybutylene is about 700° F. for 20–30 seconds, the end cap is solid due to the melt flow of the polymer. There are no air gaps, or voids, or accordion-like folds disposed therein.

Since the external diameter of the circular shoulder and the external diameter of the belled portion which is yet to be formed will be larger than the internal diameter of the nut fastening means which is interposed between the two ends of the connector, the fastening means is inserted onto the tubular connector at this point. The second end of the tubular connector is prepared in an anlogous manner to that described previously in Example #1.

The process which accomplishes the at least constant thickness objective of this invention relates to the necessity of physically pushing the heated portion of the connector into the dies under melt flow conditions so as to uniformly fill the die. It is impossible to insert a heated mandril into a hollow tube for the purposes of belling the end without simultaneously thinning the walls. Optimally, the process will include the step of cooling at least one of the dies after they are brought together.

In order to demonstrate the ramifications of the physical insertion requirements and its relationship to the overall fabrication of the product as shown in FIGS. 7–10, the following set of measurements were made on the following: the overall length of the initial constant thickness hollow tube, the length of the tube after the end cap was formed, and the length after the belled end was formed. The following results were obtained:

initial tubing length 20.6875";
tubing length after end cap 19.4375"; and
tubing length after belling 18.1250".

This clearly shows that the supplemental material used in the formation of both the end cap and the belled end was derived from the initial constant thickness hollow tube starting material, the overall length of which was reduced to compensate for the formation of the two unique ends. The need for spin welding has been eliminated.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for forming a unitary molded tubular connector having an end cap with a first internal diameter at one end of the connector, a tubular segment having a first internal diameter equal to that of the end cap and a first outer diameter and a thickness as measured as the difference between the first internal diameter and the first outer diameter, the tubular segment originating from the end cap, an opposed belled tubular end having a second larger internal diameter and a second outer diameter, the thickness of the belled end being at least the same thickness as the tubular segment, and a fastening means having an aperture disposed centrally therein, the aperture adapted so as to permit insertion over the outer diameter of the tubular segment, yet smaller than an outer diameter of a shoulder of the end cap and the outer diameter of the belled end, the connector being formed from a uniform thickness hollow cylindrical tube of the same thickness of the tubular segment, comprising the steps of:

(a) partially placing a first end of the tubular connector on a first elongated male die projection of a first male die with the projection closely conforming to the first internal diameter of the tubular connector, the first male die including a cup-shaped recess from which the first male die projection projects axially and concentrically, surrounding the first outer diameter of the tubular connector with a first female die, which also includes a recess adapted to cooperate with the recess of the first male die;

(b) holding the first end of the tubular connector with the end cap to be formed projecting from the first female die and placed at least partially on the first male die projection;

(c) heating the portion of the tubular connector projecting from the first female die sufficiently to make such projecting portion pliable enough to form;

(d) bringing the first male and female dies together and forming the heated portion of the tubular connector into an end cap by the cooperating recesses, the end cap further comprising:

an end face, a sealing surface originating from the end face and terminating in a flange having a circular shoulder and further having a centrally disposed aperture therethrough;

(e) inserting the fastening means onto the tubular connector, the fastening means having an aperture disposed centrally therein, the aperture adapted so as to permit insertion over the first outer diameter of the tubular segment, yet smaller than an outer diameter of the shoulder of the end cap;

(f) placing a second end of the tubular connector partially on an elongated second male die projection of a second male die with the projection closely conforming to the first internal diameter of the tubular connector, the second male die including an annulus-shaped recess which increases from the first internal diameter of the connector to the second internal diameter of the connector and correspondingly increases from the first outer diameter of the connector to the second outer diameter of the connector so as to maintain at least the same thickness, from which the second male die projection projects axially and concentrically, surrounding the first outer diameter of the tube with a second female die, which also includes a recess adapted to cooperate with the recess of the second male die;

(g) holding the second end of the tubular connector with the belled end to be formed projecting from the second female die and placed at least partially on the second male die projection;

(h) heating the portion of the tubular connector projecting from the second female die sufficiently to make such projecting portion pliable enough to form; and (i) bringing the second male and female dies together forming the heated portion of the tubular connector into the belled end of the second internal and external diameters, having at least the same thickness as the tubular connector, by the cooperating recesses.

2. The process of claim 1 wherein the molded tubular connector is polybutylene and the temperature of steps (c) and (h) is about 700° F. for about 20–30 seconds.

3. The process of claim 2 which includes the additional step of cooling the tubular connector after steps (c) and (h).

4. The process of claim 3 which further comprises the step of physically pushing the heated portion of the connector into the first dies under melt flow conditions so as to uniformly fill the die.

5. The process of claim 4 which further comprises the step of physically pushing the heated portion of the connector into the second dies under melt flow conditions so as to uniformly fill the die.

6. The process of claim 5 which further includes the step of cooling at least one of the dies after they are brought together in steps (d) and (i).

7. A process for forming a belled tubular end without wall thinning from a constant thickness portion of a hollow cylindrical tube comprising the steps of:

(a) placing an end of the hollow cylindrical tube having a first internal diameter and a first outer diameter and a thickness as measured as the difference between the first internal diameter and the first outer diameter, partially on an elongated male die projection of a male die with the projection closely conforming to the first internal diameter of the hollow cylindrical tube, the male die including an annulus-shaped recess which increases from the first internal diameter of the hollow cylindrical tube to a second larger internal diameter and correspondingly increases from the first outer diameter of the hollow cylindrical tube to a second larger outer diameter so as to maintain the thickness constant, from which the male die projection projects axially and concentrically, surrounding the first outer diameter of the hollow cylindrical tube with the female die, which also includes a recess adapted to cooperate with the recess of the male die;

(b) holding the end of the hollow cylindrical tube with the belled end to be formed projecting from the female die and placed at least partially on the male die projection;

(c) heating the portion of the hollow cylindrical tube projecting from the female die sufficiently to make such projecting portion pliable enough to form; and (d) bringing the dies together and forming the heated portion of the hollow cylindrical tube into the belled end by the cooperating recesses.

8. The process of claim 7 wherein the hollow cylindrical tube is polybutylene and the temperature of step (c) is about 700° F. for about 20–30 seconds.

9. The process of claim 8 which includes the additional step of cooling the hollow cylindrical tube after step (c).

10. The process of claim 9 which further comprises the step of physically pushing the heated portion of the hollow cylindrical tube into the dies under melt flow conditions so as to uniformly fill the die.

11. The process of claim 10 which further includes the step of cooling at least one of the dies after they are brought together in step (d).

* * * * *